(No Model.) 5 Sheets—Sheet 1.

P. T. BERG & N. McCONNELL.
GAS PRODUCER.

No. 580,247. Patented Apr. 6, 1897.

WITNESSES

INVENTORS (No Model.) 5 Sheets—Sheet 3.

P. T. BERG & N. McCONNELL.
GAS PRODUCER.

No. 580,247. Patented Apr. 6, 1897.

WITNESSES
INVENTORS

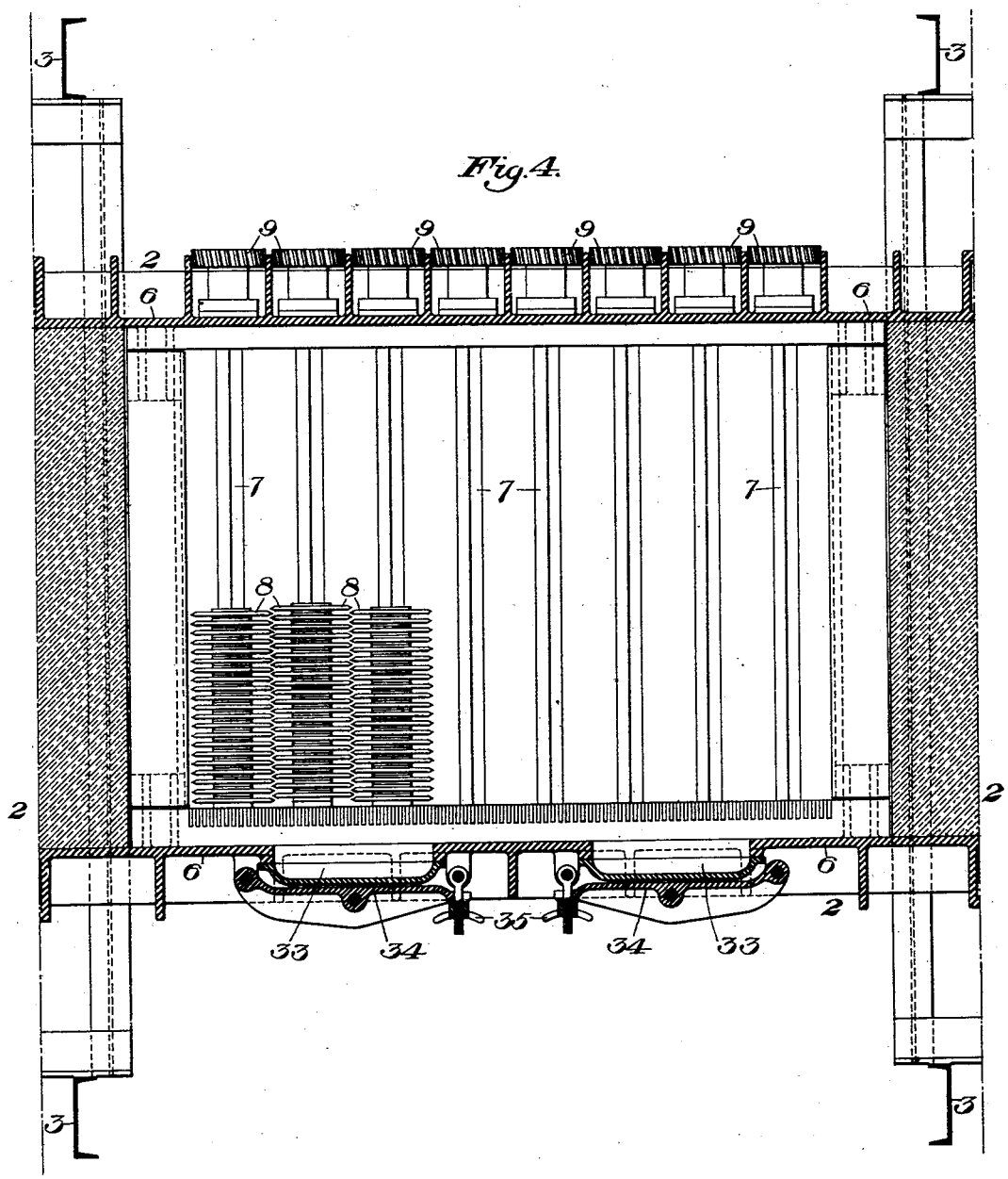

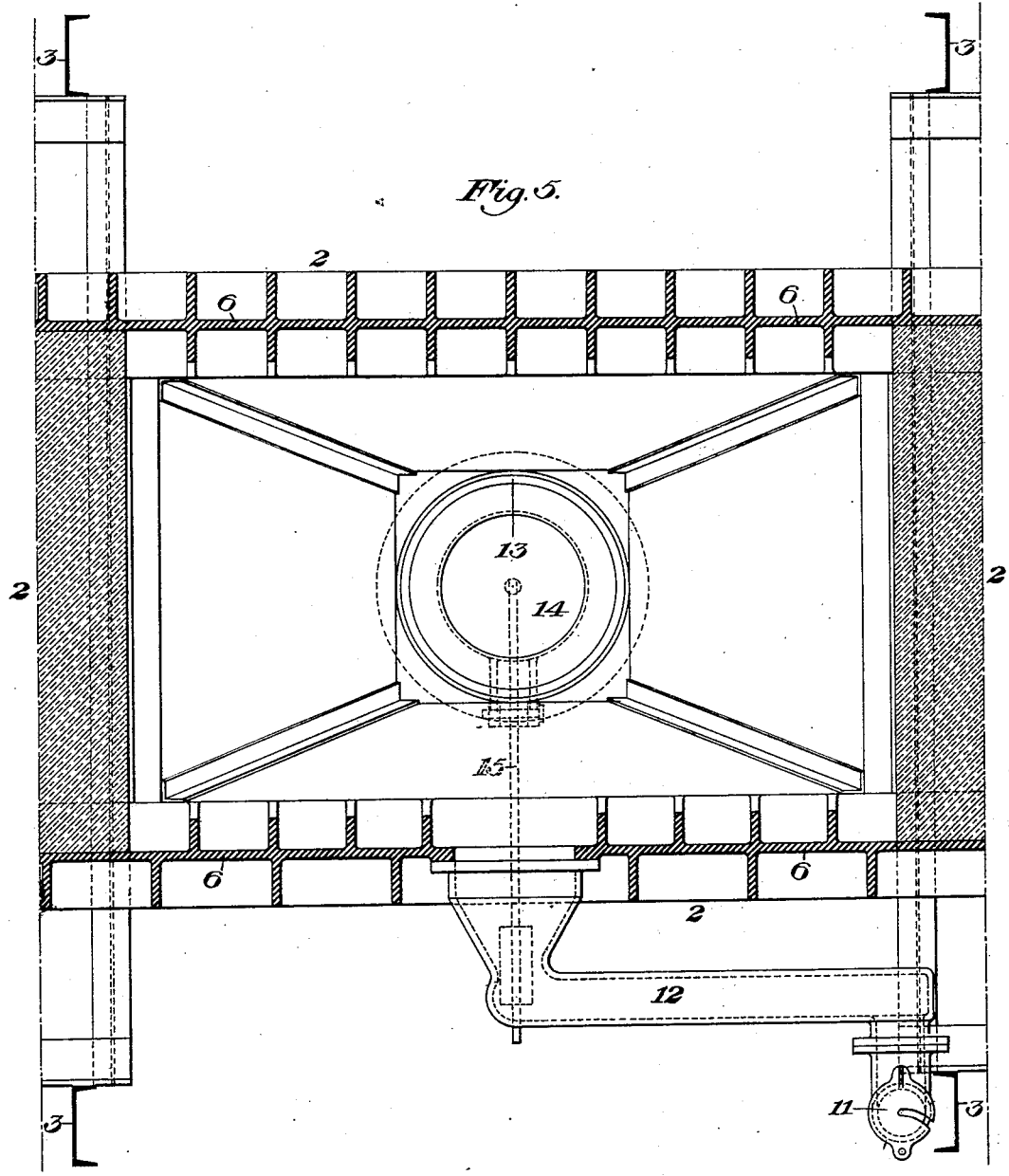

UNITED STATES PATENT OFFICE.

PER TORSTEN BERG AND NIVEN McCONNELL, OF MUNHALL, PENNSYLVANIA.

GAS-PRODUCER.

SPECIFICATION forming part of Letters Patent No. 580,247, dated April 6, 1897.

Application filed May 8, 1896. Serial No. 590,690. (No model.)

*To all whom it may concern:*

Be it known that we, PER TORSTEN BERG and NIVEN MCCONNELL, of Munhall, in the county of Allegheny and State of Pennsylvania, have invented a new and useful Improvement in Gas-Producers, of which the following is a full, clear, and exact description, reference being had to the accompanying drawings, forming part of this specification, in which—

Figure 1:
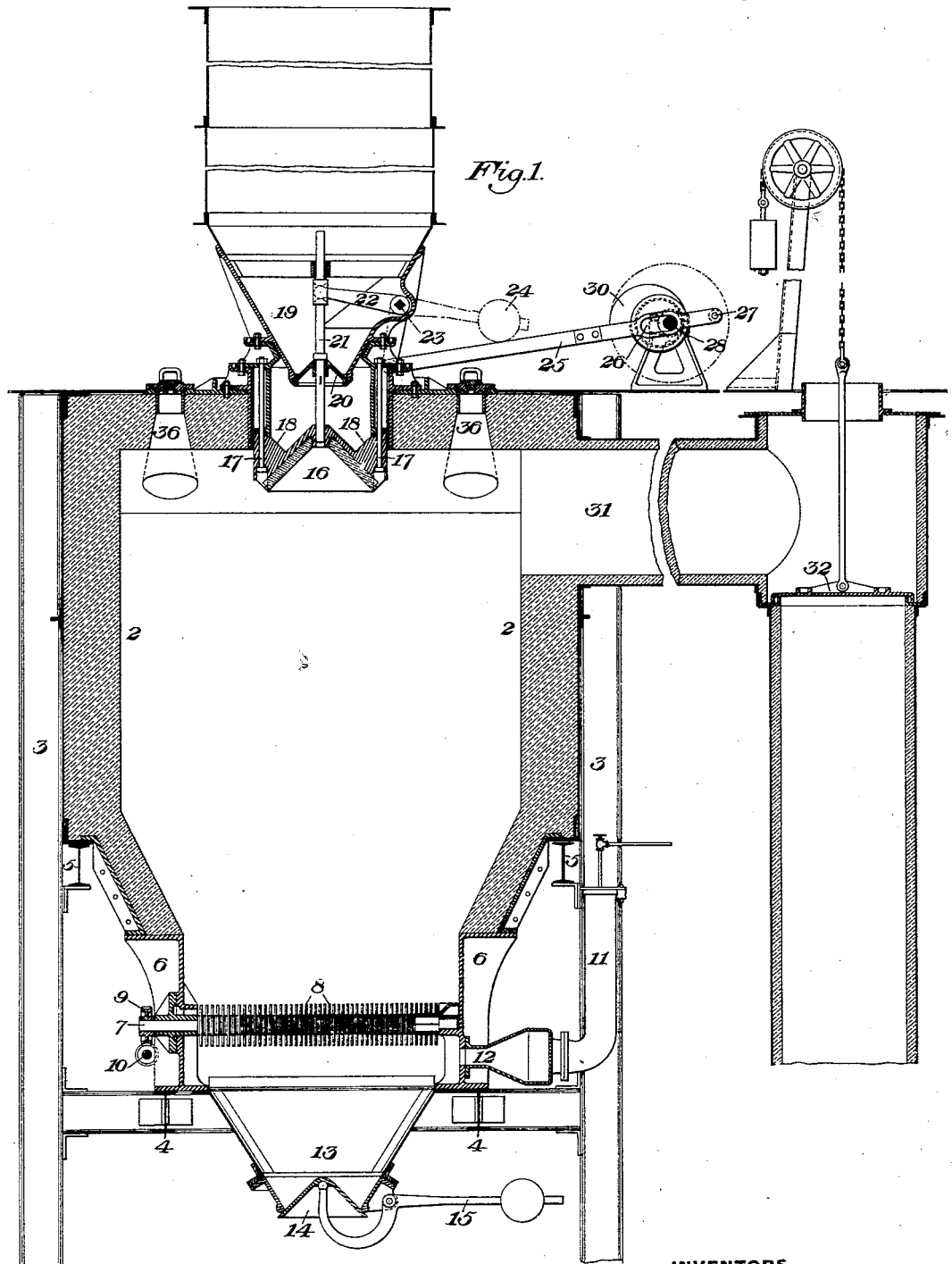
Figure 2:
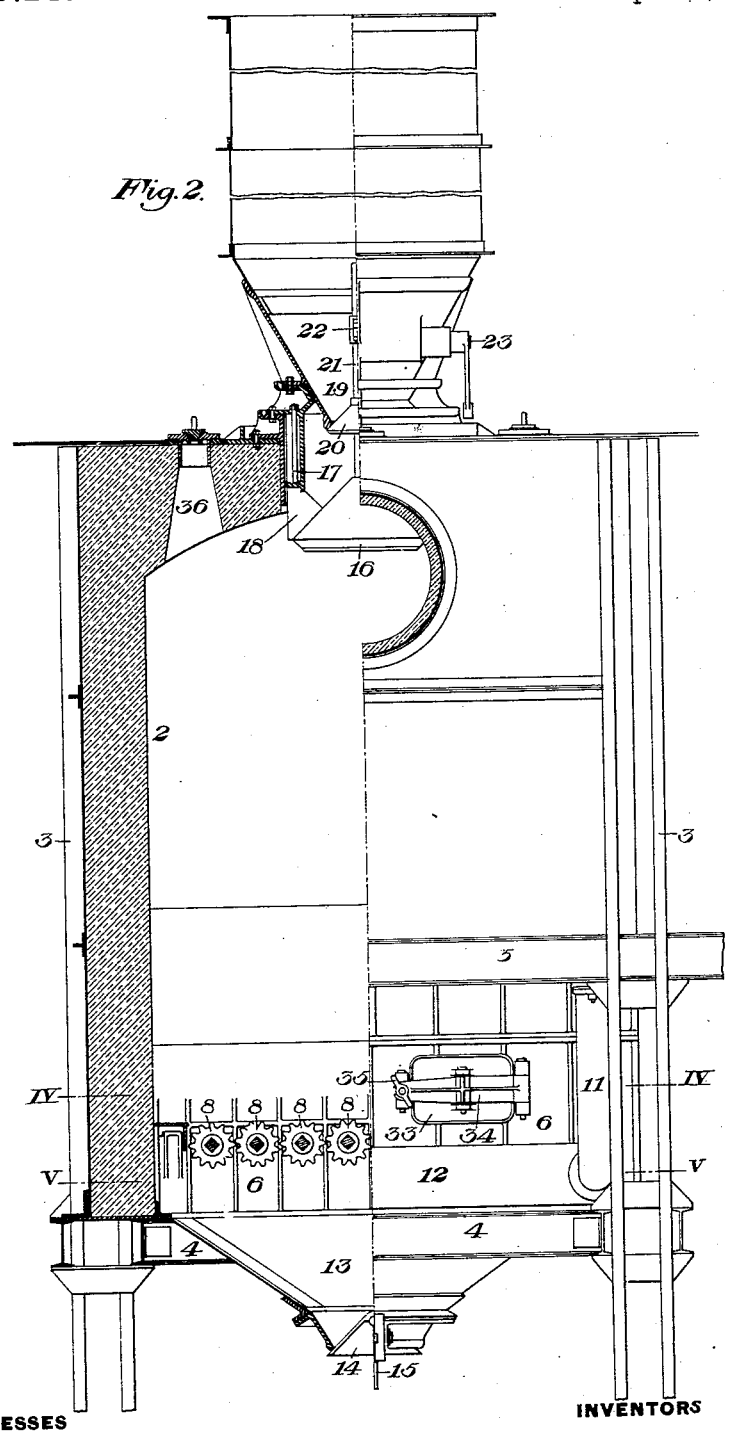
Figure 3:
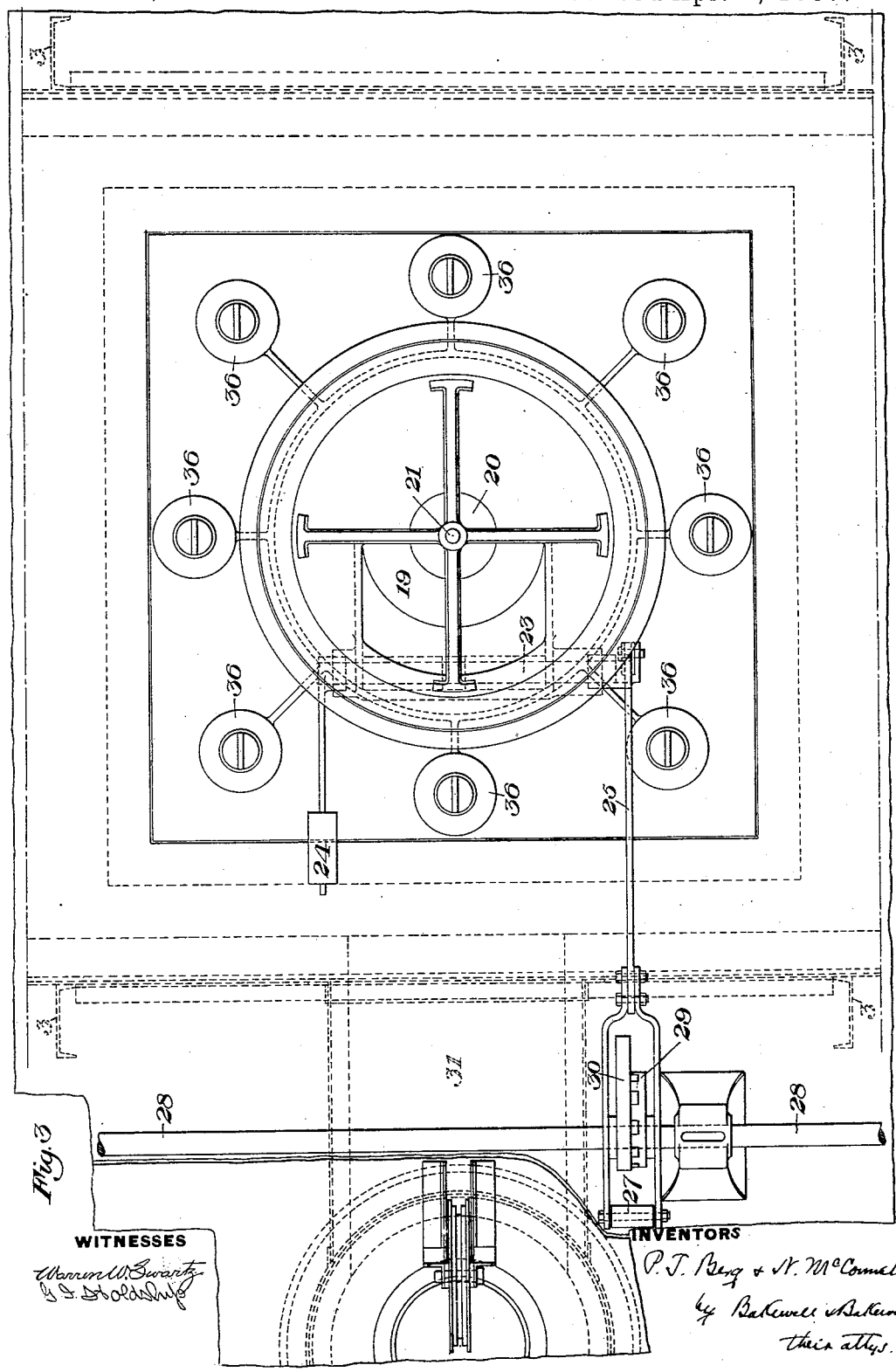

Figure 1 is a vertical sectional view of a gas-producer constructed in accordance with our invention. Fig. 2 is a side elevation, partly in vertical section, at right angles to that of Fig. 1. Fig. 3 is a top plan view, and Figs. 4 and 5 are cross-sections on the lines IV IV and V V of Fig. 2.

Our invention relates to the class of fuel-gas producers for manufacturing gas to be used in glass and steel furnaces and for similar purposes, and is designed to provide a producer of this character into which the fuel is automatically fed and in which a level grate is employed which will give a regular depth of ash-bed and may be cleaned without taking out the grate-bars, and in which the ashes can be removed from beneath the grate without interfering with the continuous operation of the producer and without any water-sealing device.

In the drawings, 2 is the rectangular body of the producer, supported between suitable uprights 3 by transverse beams 4. The lower parts of the side walls of the producer extend inwardly below the beams 5 and rest upon ribbed castings 6, which are provided with bearings for a series of transverse shafts 7, which between the bearings are squared and provided with a series of toothed disks 8, having thicker hub portions, which abut against each other and space the disks apart, thus forming rotary grate-bars. The disks upon each shaft are staggered relatively to those upon the next shaft, thus giving a large number of small orifices for the air to pass up through the ash-bed and for the dropping of the ashes. At one end these shafts are extended through the bearings and provided with worm-wheels 9, intermeshing with a worm-shaft 10, by which the grate-bars are rotated as desired.

Into the central portion of one of the side castings 6, below the grate-bars, extends the air-blast 11, having the usual steam-injector 12. Below the body of the producer is supported an air-tight hopper or ash-box 13, having its lower end closed by a bell 14, supported by a counterweighted lever 15, having a ball-and-socket connection therewith, as shown in Fig. 1. The top of the producer is provided with a charging-opening, below which a stationary distributing-bell 16 is secured by bolts 17, passing through wings or spacing-lugs 18. This bell is preferably lined with refractory material, and above it is supported the charging-hopper 19, whose lower end is normally closed by the charging-bell 20, keyed to a vertical reciprocatory shaft 21, which moves within guides in the hopper and the fixed bell and is operated by a lever 22, secured to a shaft 23. The shaft 23 is provided at one end with a counterweighted lever 24, arranged to normally move the bell up to its seat, and at its other end is provided the sliding operating-lever 25, having a slotted yoke 26, provided with an end roller 27. Through the slotted yoke passes the driving-shaft 28, which is provided with an eccentric 29, secured thereto, and provided upon one side with a series of recesses engaged by teeth upon a cam 30, secured to a sleeve which loosely surrounds said shaft. By this clutch connection between the eccentric and the cam which acts upon the roller we can regulate the throw of the cam according to the feed desired, the center of rotation of the cam being changed by rotating it about the shaft.

From the upper part of the producer leads the pipe 31 to the gas-main, this pipe having the usual controlling-valve 32. Above the grate-bars, at one side, are provided doors 33, as shown in Fig. 4, these doors being pivoted to the swinging levers 34, having securing-clamps 35 at their ends. These doors are used only in case of repairs, they giving access to the grate-bars and the interior of the producer. 36 are the usual poke-holes in the top of the producer.

The operation is apparent. The crushed coal being fed in at short intervals by the slow rotation of the shaft 28, the air passes through the small openings between the grate-bars and penetrating the ash-bed combines with the coke to form the combustible gases. The grate-bars are rotated at regular intervals to crush the clinkers and grind them through the grate with the ashes. The ashes collecting in the lower hopper are dumped from time to time by raising the lever, allowing the ashes to drop into a car beneath.

The advantages of our invention are many. A level grate is provided, so constructed that a regular depth of ash-bed can be maintained and the fire cleaned without poking or removing the grate-bars. The ashes are removed without interfering with the gas-making and without the use of the objectionable water seal. The coal is fed in small quantities at short intervals and distributed equally over the charge. The coal in the upper hopper acts as a gas seal during the feeding, thus preventing loss of gas, and the amount of the feed is easily regulated as desired. As the charging-bell is raised by the counterweight, all danger of breaking the parts on account of lodged coal is avoided.

Many variations in the form, construction, and arrangement of the parts may be made by the skilled mechanic without departure from our invention, since

What we claim is—

1. A gas-producer, having a charging-hole, a hopper carried above the same, a movable charging-bell closing the lower end of the hopper, and a rotatory shaft having connections with the bell and arranged to give the same a vertical movement at certain points in the revolution of the shaft; substantially as described.

2. A gas-producer having a charging-hole, a hopper carried above the same and having its lower end closed by a movable charging-bell, a lever arranged to raise and lower the bell, power mechanism arranged to swing the lever at determined intervals, so as to give a regular intermittent feeding of the material and means for varying the amount of movement of the lever; substantially as described.

3. A gas-producer having a charging-hole, a hopper carried above the same and having its lower end closed by a movable charging-bell, and a shaft having a lever connected to the bell, said shaft having a counterweight arranged to raise the bell, and having mechanical connections to positively lower the same at determined intervals so as to give a regular intermittent feeding of the material; substantially as described.

4. A gas-producer having a charging-hole, a hopper carried above the same and having its lower end closed by a charging-bell, which seats upwardly against the lower end of the hopper, means for moving the bell downwardly to drop the coal into the producer, and a stationary bell suspended below the charging-hole; substantially as described.

In testimony whereof we have hereunto set our hands.

P. T. BERG.
N. McCONNELL.

Witnesses:
G. I. HOLDSHIP,
C. BYRNES.